United States Patent [19]

Gergely et al.

[11] Patent Number: 5,054,878
[45] Date of Patent: Oct. 8, 1991

[54] DEVICE FOR SOURCE COMPENSATING A FIBER OPTIC COUPLER OUTPUT

[75] Inventors: John S. Gergely, Ponca City, Okla.; Wilbur J. Myers, Ft. Worth, Tex.

[73] Assignee: Conoco Inc., Ponca City, Okla.

[21] Appl. No.: 533,186

[22] Filed: Jun. 4, 1990

[51] Int. Cl.$^5$ .................... G02B 6/32; G01N 21/55
[52] U.S. Cl. ................... 385/33; 250/572; 356/446; 356/448
[58] Field of Search ................ 356/433–435, 356/445, 446, 448, 323–325; 250/572, 562; 307/425, 427; 372/21, 22, 33; 350/96.15, 96.18

[56] References Cited

U.S. PATENT DOCUMENTS

| | | | |
|---|---|---|---|
| 4,171,909 | 10/1979 | Kramer et al. | 356/73 |
| 4,208,129 | 6/1980 | Spencer | 356/425 |
| 4,229,067 | 10/1980 | Love | 350/96.15 |
| 4,234,253 | 11/1980 | Higginbotham et al. | 356/73.1 |
| 4,240,048 | 12/1980 | Zumsteg | 332/7.51 |
| 4,272,694 | 6/1981 | Jacobs | 307/427 |
| 4,498,781 | 2/1985 | Kaplit | 356/435 |
| 4,502,784 | 3/1985 | Tanaka | 356/222 |
| 4,504,949 | 3/1985 | White | 372/3 |
| 4,536,091 | 8/1985 | Allington | 356/435 |
| 4,538,278 | 8/1985 | Gergely | 372/70 |
| 4,618,957 | 10/1986 | Liu | 372/22 |
| 4,700,150 | 10/1987 | Hall et al. | 332/751 |

Primary Examiner—William L. Sikes
Assistant Examiner—Galen J. Hansen

[57] ABSTRACT

A device for source compensating a fiber optic coupler output automatically compensates for changes in light intensity at the output end of the fiber caused by changes in light intensity from the source, beam walking at the input of the fiber and mode changes in the fiber. Laser light enters a frequency doubler and exits as a doubled frequency output which is focused onto the input face of a fiber optic cable by a lens. The lens is selected so that the spot size of the focused light on the face of the fiber is smaller than the diameter of the fiber and that the entry angle of the light cone is within the acceptance angle of the fiber. The fiber is tightly wound into a mode scrambler to provide a uniform intensity distribution of the light exiting the fiber. The light leaving the fiber is collimated and directed to additional optical elements. The collimated beam is directed to a beam splitter which reflects 8% of the incident beam to a calibrated photodiode that is terminated with a transimpedance amplifier. The light that transmits through the beam splitter can be focused onto the sample. To compensate for light fluctuations, the signal from the transimpedance amplifier is divided into the signal from the sample.

5 Claims, 1 Drawing Sheet

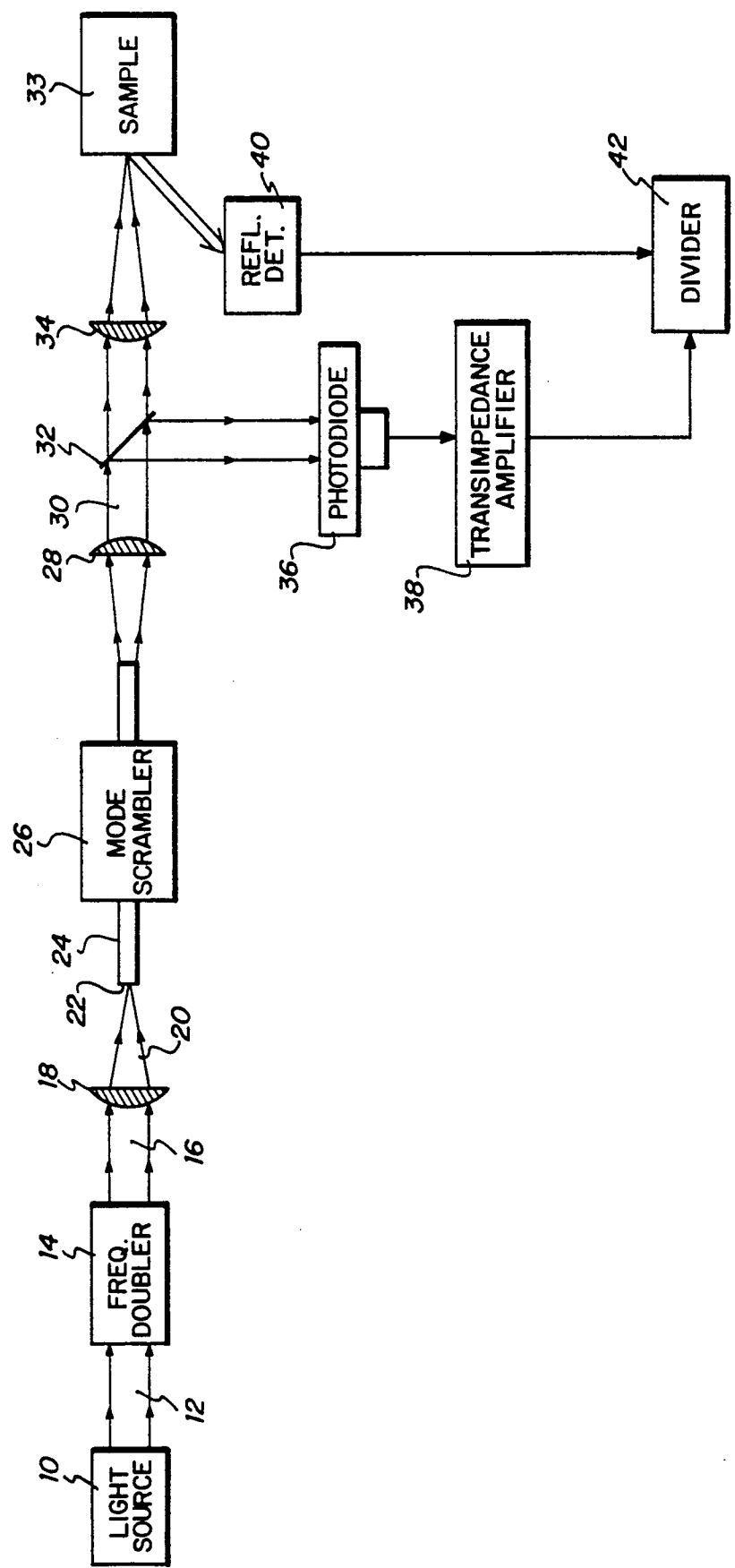

DEVICE FOR SOURCE COMPENSATING A FIBER OPTIC COUPLER OUTPUT

BACKGROUND OF THE INVENTION

1. Field of the Invention

The present invention pertains to methods and systems for coupling fiber optic cables and more particularly to coupling systems that automatically compensate for changes in light intensity at the output end of fiber caused by changes of light intensity from the source, beam walking at input of fiber, and mode changes in fiber.

2. Related Prior Art

Prior art has disclosed many methods of transmitting a light beam and producing an output. The output may be used to illuminate a sample or may use the transmitted light for any one of many purposes. The following United States patents are representative of the many different types of coupling systems that have been developed to intercede between a light source and an fiber optic cable to improve light transmission or even to produce a modified light output with a different use. Also included are patents which relate to another aspect of the system in which the present invention may be used, frequency multipliers.

U.S. Pat. No. 4,240,048, titled "Nonlinear Optical Device", issued to Fredrick C. Zumsteg, relates to a nonlinear optical device having a crystal which has nonlinear optical properties and is transparent to the radiation propagating through it. It also has predetermined symmetry and consists essentially of the compound of the formula:

$$LnF_x(OH)_{1-x}CO_3$$

wherein Ln is La, Eu or Gd and x is 0 to 1. The preferred compound is $LaOHCO_3$.

U.S. Pat. No. 4,272,694, titled "System for Converting the Frequency of Coherent Radiation", issued to Stephen D. Jacobs, relates to a system where coherent radiation which may be provided at high power and in a wide aperture beam is tripled in frequency by Type II crystals having non-linear optical coefficients. A waveplate along the beam path between the crystals corrects ellipticity which limits the conversion efficiency of the system.

U.S. Pat. No. 4,504,949, titled "Stimulated Antistokes Raman Up-Converter", issued to Jonathan C. White, relates to an anti-Stokes Raman up-converter which is capable of up-converting a variety of conventional laser sources. A metal-halide such as thallium chloride or thallium iodide is employed as a lasing medium, and is photo-dissociated to create a population inversion in a metastable state of the metal ion. An excimer laser may be employed to photo-dissociate the metal halide. In the alternative, an excimer flashlamp may be employed to photo-dissociate the metal-halide. A conventional laser source is subsequently employed to pump the population inversion from the metastable state to a virtual level near an intermediate state. Anti-Stokes Raman lasing occurs from this virtual state, where the lasing frequency is greater than the frequency of the conventional laser pump source.

U.S. Pat. No. 4,618,957, titled "Frequency Doubling A Laser Beam by Using Intracavity Type II Phase Matching", issued to Kuo-Ching Liu, relates to a frequency doubler for a laser in which a Type II SHG crystal is oriented to generate a second harmonic frequency beam in response to the orthogonal components of a fundamental beam. After the fundamental beam makes a round trip through the SHG crystal, and differential phase delays between the E and O rays of the fundamental beam due to birefringence are eliminated. This is done to improve the efficiency and stability of the cavity.

U.S. Pat. No. 4,700,150, titled "External Laser Frequency Stabilizer", issued to John L. Hall and Theodor W. Hansch, relates to an external laser frequency stabilizer which combines an acousto-optic frequency shifter and a fast electro-optic phase modulator. A compensating electronic delay line in a crossover network is used to provide a transducer response while keeping the voltage across the electro-optic crystal away from the amplifier limits.

U.S. Pat. No. 4,538,278, titled "Apparatus and Method for Generating Light in the Near Ultraviolet to Infrared Range", issued to John S. Gergely, relates to a source of linearly polarized light having a wavelength range of about 550 to 1100 nanometers to provide light into one end of an optical fiber. A nonlinear crystal of the type that mixes the frequency of light passing therethrough is positioned adjacent the other end of the fiber. The fiber transmits light from the source to the crystal which increases its frequency up to 100%, dependent upon crystal selection providing light in the 250-550 nanometer wavelength range. Adjusting the radial orientation of the crystal with respect to the fiber optimizes conversion of light to the 250-550 nanometer range. Such light is directed into organic dye which emits fluorescent light in the range of about 400 to 1000 nanometers dependent upon the type of dye selected.

SUMMARY OF THE INVENTION

The present invention provides a source compensated fiber optic output coupler that automatically compensates for changes in light intensity at the output end of the fiber caused by changes in light intensity from the source, beam walking at the input of the fiber and mode changes in the fiber. Laser light enters a frequency doubler and exits as a doubled frequency output which is focused onto the output phase of a fiber optic cable by a lens. The lens is selected so that the spot size of the focused light on the face of the fiber is smaller than the diameter of the fiber and that the entry angle of the light cone is within the acceptance angle of the fiber. The fiber is tightly wound into a mode scrambler to provide a uniform intensity distribution of the light exiting the fiber. The light leaving the fiber is collimated and directed to additional optical elements. The collimated beam is directed to a beam splitter which reflects 8% of the incident beam to a calibrated photodiode that is terminated with a transimpedance amplifier. The light that transmits through the beam splitter can be focused onto the sample. To compensate for light fluctuations, the signal from the transimpedance amplifier is divided into the signal from the sample.

BRIEF DESCRIPTION OF THE DRAWINGS

The attached drawing is of a coupling system in which light emitted from a laser is transmitted to illuminate a sample.

DESCRIPTION OF THE PREFERRED EMBODIMENT

The present invention automatically compensates for changes in light intensity at output end of fiber caused by changes of light intensity from the source, beam walking at input of fiber, and mode changes in fiber.

The present invention eliminates the effect of beam walking of laser light that is frequency doubled by a doubling crystal and will work over a wavelength range from 250 nanometers (nm) to 1.25 microns. The need for the present invention came about when the doubled output of a tunable dye laser was directed into a microscope using beam steerers. This was done to determine the API° of crude oils before drill stem tests and API° of oil in fluid inclusions. When a laser wavelength is changed, a doubling crystal has to be rotated so the new wavelength is efficiently doubled. This is because the doubling axis of the crystal changes for different wavelengths. When the crystal rotates, the output beam from the crystal moves laterally, and completely misaligns all the optical components downstream from the doubler. The fiber optic coupling system of the present invention eliminates the effects of beam walking.

Referring now to the attached figure, the coupling system of the present invention is illustrated as having a laser light source 10 providing a collimated light beam 12 to a frequency doubler 14. A doubled output light beam 16 provided by frequency doubler 14 is incident upon a focusing lens 18. Focused light beam 20 is incident upon the face 22 of fiber optic cable 24. While being transmitted through fiber optic cable 24, light beam 20 travels through mode scrambler 26. Light beam 20 exits fiber optic cable 24 and travels through collimating lens 28. Collimated light 30 passes through and is partially reflected by beam splitter 32. The portion of light 30 that passes through beam splitter 32 is focused on a sample 33 by focusing lens 34. The portion of light 30 that is reflected by beam splitter 32 is detected by a calibrated photodiode 36, which provides a signal to a transimpedance amplifier 38. The portion of the light that illuminates sample 33 is detected by reflection or fluorescence detector 40, which provides a signal representative of the light reflected from the sample to divider 42. Divider 42 calculates a ratio the signals of the reflected light from beam splitter 32 from transimpedance amplifier 38 and the light reflected from sample 33 from reflection or fluorescence detector 40.

In operation laser light 12 enters frequency doubler 14 and exists as a doubled frequency output 16 which is focused onto the input face 22 of fiber-optic cable 24 by lens 18. Lens 18 was chosen so the spot size of focused light 20 on face 22 of optic fiber 24 would be smaller than the diameter of fiber 24, and that the entry angle of the light cone would be within the acceptance angle of the fiber. The latter must be true for focused light 20 to remain in fiber 24 as it propagates by total internal reflection. To ensure this, the following had to be done. First, a lens had to be chosen that has an F number greater than the F number of fiber 24. Second, the diffraction limited spot size had to be determined. Third, the spherical aberration had to be determined. And finally, the diffraction limited spot size and the spherical aberration had to be combined to determine the actual spot size.

Fiber cable 24 and lens 18 were chosen to transmit light over a wide wavelength range, even into the ultraviolet region. Fiber-cable 24 is preferably the ultraviolet-visible type from Guided Wave, Inc., and lenses 18, 28 and 34 are preferably plano-convex, made from ultraviolet grade synthetic fused silica from Melles Griot, Inc. Fiber cable 24 transmits light from 250 nm to about 2 microns without darkening, and lenses 18, 28 and 34 transmit light from about 180nm to 1.25 microns. So the operating range of the device is from 250 nm to 1.25 microns.

In choosing a lens that has an F number greater than the F number of the fiber the following considerations were used.

The F number is inversely proportional to the angle of converging or diverging cone of light leaving a lens. F number is defined as:

$$F \text{ Number} = \frac{1}{2 \text{ N.A.}} = \frac{FL}{D} = \frac{1}{2\left(\sin\frac{\alpha}{2}\right)}$$

where
N.A. = numerical aperture
FL = focal length of lens
D = diameter of illuminated spot on lens
$\alpha$ = angle of divergence or convergence The F number of fiber 24 is 2.27. Lens 18, such as a fifty millimeter focal length lens, illuminated with a five millimeter diameter output beam 16 from doubler 14 gives an F number of 10 for the converging light passing through lens 18.

The F number, 10, of lens 18 is greater than the F number, 2.27, of fiber 24. This ensures that the light will remain in the fiber as it propagates.

The diffraction limited spot size is determined using the following formula.

The diffraction limited spot size is given by:

$$SS_{DIFF} = \frac{2 \, FL \times \lambda}{\pi \times R}$$

where
FL = focal length of lens
$\lambda$ = wavelength of incident light
R = radius of illuminating beam For the 50 mm focal length lens, an excitation wavelength of 320 nanometers, and a beam radius of 2.5 mm, the diffraction limited spot size is 4.1 microns.

The spherical aberration is determined by the following formula.

The spherical aberration is given by:

$$SA = \frac{0.067 \times FL}{(F \text{ number})^3}$$

For the 50 mm focal length lens having an F number of 10 gives an SA of 3.35 microns.

The total spot size is 7.45 microns. The diameter of fiber 24 is 320 microns, so the spot has ample room to walk on input face 22 of fiber 24 and still couple into fiber 24.

The intensity distribution of light 20 leaving fiber 24 was not uniform and would change due to modes set up in fiber 24. Sometimes it would appear as a donut, sometimes as a disk with much higher intensity toward the outside edge. The intensity distribution must be uniform so samples are illuminated uniformly. If this is not done, a weak intensity wavelength of excitation, $\lambda_1$, could produce more signal from the sample than a strong intensity wavelength, $\lambda_2$. This could happen if the sample is illuminated with a bright part of the spot of $\lambda$hd 1 and a weak part of the spot from $\lambda_2$. To avoid this, fiber 24 was tightly wound into mode scrambler 26, so a uniform intensity distribution left fiber 24.

Next, light 20 leaving fiber 24 has to be collimated so it can be easily directed to other optical elements. To collimate light, the divergence must be around $1°\simeq17$ mrad. To choose a lens that will produce a 17 mrad divergence, the following equation is used:

$$FL = \frac{SOS}{DIV}$$

where
FL = focal length of lens
SOS = size of the source of light
DIV = full angle divergence For a 320 micron core fiber to give a 17 mrad divergence requires an 18.8 mm focal length lens. The preferred embodiment uses a Melles Griot off-the-shelf 15 mm focal length lens as lens 28 that will give a 21 mrad or 1.2 angle of divergence. This is acceptable for collimation.

Next, part of collimated beam 30 had to be detected so changes in light intensity could be compensated. Light levels could change from source fluctuations and beam walking across the input face of the fiber. To do this, an ultraviolet grade, synthetic, fused silica, uncoated laser mirror acted as a beam splitter 32. Beam splitter 32 reflects eight percent of the incident beam to a calibrated photodiode 36. In the preferred embodiment, photodiode 36 is Model 222 from United Detector Technology. Photodiode 36 is terminated with a transimpedance amplifier 38. In the preferred embodiment amplifier 38 is Model 101C, also from United Detector Technology. The portion of light 30 that transmits through beam splitter 32 can be focused by lens 34 onto the sample or the sample can be illuminated directly by collimated light leaving the beam splitter 32. To focus the light, the same type of 50 mm focal length lens is used that coupled light 20 into fiber 24.

To compensate for light fluctuations, the signal from transimpedance amplifier 38 is divided into the signal from the sample. If the source light goes down by 10 percent, the signal from the linear sample goes down 10 percent, and photodiode 36 signal goes down by 10 percent. However, the ratioed value remains constant.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A device for source compensating a fiber optic coupler output comprising: a light source for providing a polarized light beam; frequency doubler for doubling the frequency of said polarized light beam to produce a doubled frequency output; first lens for focusing said doubled frequency output; first optic cable for receiving said focused output; mode scrambler associated with said fiber optic cable to provide an output light with uniform intensity distribution;

collimating lens to collimate said output light with uniform intensity distribution;

beam splitter to reflect a predetermined amount of said collimated output light and pass another predetermined amount of said collimated output light;

focusing lens to focus said passed collimated output light to illuminate a sample;

means to provide a signal representing light illuminating said sample;

calibrated photodiode to receive said reflected collimated output light;

transimpedance amplifier to provide a signal proportionate to said reflected collimated output light; and means for dividing said signal representing light illuminating said sample by said transimpedance signal to obtain a ratio whereby said signal representing light illuminating said sample is source compensated.

2. An apparatus for compensating for discrepancies in a light beam that occurs between a light source and an optic fiber comprising:

frequency doubler for receiving the light beam and doubling the frequency of the light beam to produce a doubled frequency output;

first lens for focusing said doubled frequency output onto a face of the optic fiber cable;

mode scrambler associated with the fiber optic cable to provide an output light with uniform intensity distribution;

collimating lens for receiving said output light to produce a collimated output light with uniform intensity distribution;

beam splitter to reflect a first predetermined amount of said collimated output light and pass a second predetermined amount of said collimated output light;

means for illuminating a sample with said second predetermined amount of collimated output light;

means for receiving light reflected from said sample and producing a signal in response thereto;

calibrated photodiode configured to receive said first predetermined amount of collimated output light;

transimpedance amplifier connected to said calibrated photodiode to provide a signal proportionate to said first predetermined amount of collimated output light; and means for dividing said signal from said means for receiving light reflected from said sample by said transimpedance signal to obtain a ratio.

3. The apparatus according to claim 2 wherein said means for illuminating includes a focusing lens for focusing said second predetermined amount of collimated output light on said sample.

4. A method for compensating for light beam discrepancies originating in a light source comprising:

receiving the light beam and doubling the frequency of said light beam to produce a doubled frequency output;

focusing said doubled frequency output onto a face of the optic fiber cable;

producing a uniform output light intensity distribution by a mode scrambler associated with said optic fiber cable;

receiving said output light and producing a collimated output light with uniform intensity distribution;

reflecting a first predetermined amount of said collimated output light and passing a second predetermined amount of said collimated output light;

illuminating a sample with said second predetermined amount of collimated output light;

receiving light reflected or emitted from said sample and producing a signal in response thereto;

detecting said first predetermined amount of collimated output light;

calculating a signal proportionate to said first predetermined amount of collimated output light;

dividing said signal produced in response to the light reflected or emitted from said sample by said signal proportionate to said first predetermined amount of collimated output light; and obtaining a ratio from said divided signals whereby said signal produced in response to the light reflected or emitted from said sample is compensated for said light beam discrepancies.

5. The method according to claim 4 wherein said illuminating step includes the step of:

focusing said second predetermined amount of collimated output light.

* * * * *